United States Patent [19]

Schwab et al.

[11] Patent Number: 5,047,294
[45] Date of Patent: Sep. 10, 1991

[54] USE OF POLYURETHANE RESINS FOR AQUEOUS FILLER COMPOSITIONS

[75] Inventors: Michael Schwab, Mainz-Kostheim; Gerd Walz, Wiesbaden, both of Fed. Rep. of Germany

[73] Assignee: Hoechst AG, Fed. Rep. of Germany

[21] Appl. No.: 396,964

[22] Filed: Aug. 18, 1989

[30] Foreign Application Priority Data

Aug. 19, 1988 [DE] Fed. Rep. of Germany ....... 3828157

[51] Int. Cl.$^5$ .................... B32B 27/00; B05D 3/02
[52] U.S. Cl. ................... 428/432.1; 427/388.4; 427/407.1; 427/409
[58] Field of Search ................. 427/388.4, 407.1, 409; 524/591, 539g36; 428/423.1

[56] References Cited

U.S. PATENT DOCUMENTS

| 4,558,090 | 12/1985 | Drexler et al. | 524/591 |
| 4,719,132 | 1/1988 | Porter, Jr. | 428/423.1 |
| 4,829,122 | 5/1988 | Pedaini et al. | 428/423.1 |
| 4,914,148 | 4/1990 | Hille et al. | 428/423.1 |
| 4,948,829 | 8/1990 | Mitsuji et al. | 524/507 |
| 4,968,536 | 11/1990 | Goldner et al. | 427/409 |
| 4,977,207 | 12/1990 | Hoefer et al. | 524/591 |

Primary Examiner—Michael Lusignan
Assistant Examiner—D. L. Dudash
Attorney, Agent, or Firm—Bierman and Muserlian

[57] ABSTRACT

Use of a water-dispersible polymer as binder in an aqueous filler composition which may or may not comprise, in addition to other polymeric binders, crosslinking agents and the customary additives, wherein the water-dispersible polymer is a polyurethane resin which contains building blocks derived from (A) polyisocyanates,
(B) polyols having an average molecular weight $M_n$ of at least 400,
(C) low-molecular polyols if desired and,
(D) compounds containing at least two groups reactive toward isocyanate groups and at least one group capable of forming anions, and
(E) compounds which are monofunctional or contain active hydrogen of variable reactivity, these building blocks being always positioned at the chain end fo the polyurethane resin, and optionally
(F) compounds which are other than (B), (C), (D) and (E) and contain at least two groups reactive toward NCO groups.

The crosslinked filler coatings obtainable therefrom are distinguished, inter alia, by improved stone-chip resistance at low temperatures and by good intercoat adhesion.

14 Claims, No Drawings

USE OF POLYURETHANE RESINS FOR AQUEOUS FILLER COMPOSITIONS

Filler compositions are applied especially in the automotive industry as an intermediate coat between primer and topcoat; their purpose is, on the one hand, to even out any irregularities present in the primer, thus ensuring a blemish-free appearance of the topcoat, and on the other hand to improve the stone-chip resistance of the overall paintwork. By virtue of its flexible character, this coat is intended to prevent penetration of scattered particle fragments, for example hurled against the paintwork by passing vehicles or by the vehicle itself. On the other hand, the filler compositions must provide relatively hard films which would allow the paint to be wetsanded without sandpaper needing to be used.

EP Offenlegungsschrift 249,727 discloses environmentally safe, waterborne filler compositions (so-called 'water fillers' or 'hydrofillers') which contain a mixture of water-thinnable polyester resin, water-soluble epoxy resin-phosphoric acid ester and a melamine resin as binders. The processability and properties profile of these filler compositions or of the films obtainable therefrom are on the whole very good, and yet, inter alia, their stone-chip resistance, especially at lower temperatures ($<0°$ C.) and intercoat adhesion, especially to the topcoat, are not in all cases satisfactory.

It has now been found that aqueous filler compositions based on certain water-dispersible polyurethane resins are free from these drawbacks.

Accordingly, the invention relates to the use of a water-dispersible polymer as binder in an aqueous filler composition which may or may not comprise, in addition to other polymeric binders, crosslinking agents and the customary additives, wherein the water-dispersible polymer is a polyurethane resin which contains building blocks derived from (A) polyisocyanates,
(B) polyols having an average molecular weight e,ovs/M/$_n$ of at least 400,
(C) low-molecular polyols if desired,
(D) compounds containing at least two groups reactive toward isocyanate groups and at least one group capable of forming anions, preferably a COOH group,
(E) compounds which are monofunctional or contain active hydrogen of variable reactivity, these building blocks
(E) being always positioned at the chain end of the polyurethane resin, and/or
(F) compounds which are other than (B), (C), (D) and (E) and contain at least two groups reactive toward NCO groups.

The polyurethane resin used according to the invention generally has an average molecular weight e,ovs/M/$_n$ (calculated from the stoichiometry of the starting material) of 1,600 to 50,000, preferably 1,600 to 10,000 and in particular 2,000 to 6,000, an acid value of 10 to 80, preferably 25 to 60, and a hydroxyl value of 30 to 150, preferably 30 to 80. It is water-dispersible in at least an alkaline medium and at low molecular weights is frequently even water-soluble under these conditions. The molecular chains of this polyurethane resin are in general predominantly linear, but in some cases a small degree of branching of preferably up to 30 %, in particular up to 10 %, may be an advantage. The gel fraction of the said resin is generally smaller than 5 % by weight, preferably smaller than 1% by weight. At the statistical average, each polymeric chain comprises preferably at least two, in particular 4 to 6 groups containing active hydrogen, such as amino and/or OH groups.

As regards the polyisocyanates, preferably the diisocyanates (A), these are compounds known in the field of polyurethane chemistry and paints, such as aliphatic, cycloaliphatic or aromatic diisocyanates. These preferably possess the formula $Q(NCO)_2$, where Q is a hydrocarbon radical of 4 to 40 carbon atoms, in particular 4 to 20 carbon atoms, and preferably an aliphatic hydrocarbon radical of 4 to 12 carbon atoms, a cycloaliphatic hydrocarbon radical of 6 to 15 carbon atoms, an aromatic hydrocarbon radical of 6 to 15 carbon atoms or an araliphatic hydrocarbon radical of 7 to 15 carbon atoms. Examples of such diisocyanates preferably to be used are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4,-diisocyanatodicyclohexylmethane, 4,4,-diisocyanatodicyclohexyl-2,2-propane, 1,4-diisocyanatobenzene, 2,4- or 2,6-diisocyanatotoluene or mixtures of these isomers, 4,4'- or 2,4'-diisocyanatodiphenylmethane, 4,4'-diisocyanatodiphenyl-2,2-propane, p-xylylene diisocyanate and a,a',a',-tetramethyl-m- or p-xylylene diisocyanate as well as mixtures of these compounds.

In addition to these simple polyisocyanates, polyisocyanates containing heterocyclic atoms in the radical linking the isocyanate groups are also suitable. Examples of these are polyisocyanates containing carbodiimide groups, allophonate groups, isocyanurate groups, urethane groups, acylated urea groups or biuret groups. For other suitable polyisocyanates reference should be made, for example, to DE Offenlegungsschrift 2,928,552.

The proportion of the polyisocyanates (A) in the polyurethane resin is usually about 10 to 50% by weight, preferably 25 to 35% by weight, based on the polyurethane resin.

The polyols according to (B) preferably have an average molecular weight e,ovs/M/$_n$ of 400 to 5,000, in particular 800 to 2,000. Their hydroxyl value is generally 30 to 280, preferably 50 to 200 and in particular 80 to 160 mg of KOH/g.

Examples of such polyols which represent compounds known from the polyurethane chemistry are polyether polyols, polyester polyols, polycarbonate polyols, polyester amide polyols, polyamide polyols, epoxy resin polyols and reaction products thereof with $CO_2$, polyacrylate polyols and the like. Such polyols which may also be used in a mixture, are disclosed, for example, in DE Offenlegungsschriften 2,020,905, 2,314,513 and 3,124,784 as well as in EP Offenlegungsschrift 120,466.

Of these polyols, the polyether polyols and polyester polyols are preferred, especially those which only possess terminal OH groups and have a functionality of less than 3, preferably of 2.8 to 2 and in particular of 2.

Examples of polyether polyols are polyoxyethylene polyols, polyoxypropylene polyols, polyoxybutylene polyols and preferably polytetrahydrofurans with terminal OH groups.

The polyester polyols particularly preferred according to the invention are the known polycondensates of diols as well as, if desired, polyols (triols, tetraols) and dicarboxylic as well as, if desired polycarboxylic (tricarboxylic, tetracarboxylic) acids or hydroxycarboxylic acids or lactones. For the preparation of the polyesters it is also possible to use instead of the free polycarboxylic acids the corresponding polycarboxylic acid anhydrides or the corresponding polycarboxylic acid esters of lower alcohols. Examples of suitable diols are ethylene glycol, butylene glycol, diethylene glycol, triethylene glycol, polyalkylene glycols such as polyethylene glycol, furthermore propanediol, 1,4-butanediol, 1,6-hexanediol, neopentyl glycol or neopentyl glycol hydroxypivalate, the last three compounds being preferred. Examples of polyols which may be used, if desired, are trimethylolpropane, glycerol, erythritol, pentaerythritol, trimethylolbenzene or trishydroxyethyl isocyanurate.

Examples of suitable dicarboxylic acids are: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, 'chlorendic' acid, tetrachlorophthalic acid, maleic acid, fumaric acid, itaconic acid, malonic acid, suberic acid, 2-methylsuccinic acid, 3,3-diethylglutaric acid and 2,2-dimethylsuccinic acid. Anhydrides of these acids may be equally used, where they exist. The expression "acid" is therefore understood to comprise the anhydrides. It is also possible to employ monocarboxylic acids such as benzoic acid and hexanecarboxylic acid, provided that the average functionality of the polyol is greater than 2. Saturated aliphatic or aromatic acids, such as adipic acid or isophthalic acid, are preferred. Trimellitic acid is an example of a polycarboxylic acid which may be used in small amounts at the same time, if desired.

Examples of hydroxycarboxylic acids which may be used as coreactants in the preparation of a polyester polyol with terminal hydroxyl, are inter alia hydroxycapronic acid, hydroxybutyric acid, hydroxydecanoic acid, hydroxystearic acid and the like. Lactones which may be used, are inter alia caprolactone, butyrolactone and the like.

The proportion of the component (B) in the polyurethane resin is usually between 15 and 80 % by weight, preferably between 40 and 60% by weight, based on the polyurethane resin.

The low-molecular polyols (C) which may be used, if desired, for the synthesis of the polyurethane resins, usually produce a reinforcement of the polymeric chain. They generally have a molecular weight of about 60 to 400, preferably 60 to 200, and hydroxyl values, for example, of 200 to 1,500. They may contain aliphatic, alicyclic or aromatic groups. Their proportion is generally from 0 to 20, preferably 1 to 10 % by weight, based on the polyol components (B) to (D). Examples of low-molecular polyols having up to about 20 carbon atoms per molecule, are ethylene glycol, diethylene glycol, 1,2-propanediol, 1,3-propanediol, 1,4-butanediol, 1,3-butylene glycol, cyclohexanediol, 1,4-cyclohexanedimethanol, 1,6-hexanediol, bisphenol A (2,2-bis(4-hydroxyphenyl)-propane), hydrogenated bisphenol A (2,2-bis(4-hydroxycyclohexyl)propane) and mixtures thereof, as well as the triol trimethylolpropane.

Compounds suitable for the building block (D) are disclosed, for example, in U.S. Pat. Nos. 3,412,054 and 3,640,924 and in DE Offenlegungsschriften 2,624,442 and 2,744,544, to which reference is here made. Particular suitable compounds for this purpose are those polyols, preferably diols, which contain at least one carboxyl group, generally 1 to 3 carboxyl groups, per molecule. Sulfonic acid groups are also suitable as groups capable of forming anions. Corresponding examples are: dihydroxycarboxylic carboxylic acids such as α,α-dialkylolalkanoic acids, in particular α,α-dimethylolalkanoic acids such as 2,2-dimethylolacetic acid, 2,2-dimethylolpropionic acid, 2,2-dimethylolbutyric acid, 2,2-dimethylolpentanoic acid, dihydroxysuccinic acid, as well as polyhydroxy acids such as gluconic acid. In this connection, 2,2-dimethylolpropionic acid is particularly preferred. Examples of the compounds (D) containing amino groups are α,δ-diaminovaleric acid 2 4-diaminotoluene-5-sulfonic acid and the like. Mixtures of these compounds (D) may be also employed. The proportion of the component (D) in the polyurethane resin is generally from 2 to 20, preferably from 4 to 10% by weight, based on the polyurethane resin.

The polyurethane resin used according to the invention preferably also contains the building blocks (E) which are in each case located at the chain ends and terminate them (chain stoppers). These building blocks (E) are derived in the first place from monofunctional compounds which react with NCO groups, such as monoamines, especially secondary monoamines, or monoalcohols. Specific examples are: methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitably substituted derivatives thereof, amidoamines obtained from primary diamines and monocarboxylic acids, monoketimes obtained from primary diamines, -primary/tertiary amines such as N,N-dimethylaminopropylamine and the like.

Compounds which are preferred for (E) are those which contain an active hydrogen of variable reactivity toward NCO groups, such as compounds which contain, in addition to a primary amino group, also secondary amino groups, or in addition to an OH group also COOH groups, or in addition to a (primary or secondary) amino group also OH groups, the compounds named last being preferred. Corresponding examples are: primary/secondary amines such as 3-amino-1-methylaminopropane, 3-amino-1-ethylaminopropane, 3-amino-1-cyclohexylaminopropane, 3-amino-1-methylaminobutane; monohydroxy carboxylic acids such as hydroxyacetic acid, lactic acid or malic acid, also alkanolamines such as N-aminoethylethanolamine, ethanolamine, 3-aminopropanol, neopentanolamine and diethanolamine, the compound named last being particularly preferred.

In this manner functional groups are additionally introduced into the polymeric end product, which is thus rendered capable of reacting with materials such as curing agents. The proportion of (E) in the polyurethane resin is usually between 2 and 20, preferably between 3 and 10% by weight, based on the polyurethane resin.

Additionally to the building blocks according to (E), or instead of these, the polyurethane resin according to the invention may also comprise the building blocks (F) which are derived from the so-called chain extenders, although this variant is less preferred. Suitable compounds are preferably difunctional compounds, known for this purpose, containing groups reactive toward NCO; these compounds are not identical with (B), (C), (D) and (E) and in most cases have an average molecular weight of up to 400. Specific examples are water, hydrazine, poly(di)amines such as ethylenediamine, diaminopropane and hexaumethylenediamine, which compounds may also carry substituents, such as OH groups. Such polyamines are disclosed, for example, in DE Offenlegungsschrift 3,644,371.

The preparation of the polyurethane resin used according to the invention is carried out as follows: (A) a polyurethane prepolymer is first prepared from the polyisocyanates according to (A), the polyols according to (B) and, if desired, the low-molecular polyols according to (C) and the compounds according to (D); this prepolymer containing on average at least 1.7, preferably 2 to 2.5 free isocyanate groups per molecule, is then reacted with compounds according to (E) and/or (F) in a non-aqueous system and the fully formed polyurethane resin is then neutralized in the usual manner and converted to the aqueous system. The neutralization and the reaction with (F) may take place, if desired, after the conversion to the aqueous system.

The polyurethane prepolymer is prepared by known methods. For this purpose, the polyisocyanate is reacted with the polyols (B) to (D) in excess, in order that a product containing free isocyanate groups may result. These isocyanate groups are terminal and/or lateral, preferably terminal. It is expedient for the amount of the polyisocyanate to be such that the equivalent ratio of isocyanate groups to the total number of OH groups in the polyols (B) to (D) is 1.05 to 1.4, preferably 1.1 to 1.3.

The reaction for the preparation of the prepolymer is normally carried out at temperatures of 60° to 95° C., preferably 60° to 75° C., depending on the reactivity of the isocyanate used, usually in the absence of a catalyst, but preferably in the presence of solvents which are non-reactive toward isocyanates. Solvents particularly suitable for this purpose are those which are compatible with water, such as the ethers, ketones and esters referred to further below, as well as N-methylpyrrolidone. The proportion of this solvent does not expediently exceed 20% by weight, and is preferably in the range of 5 to 15% by weight, in each case based on the total of the polyurethane resin and solvent. It is expedient slowly to add the polyisocyanate to the solution of the remaining components.

The prepolymer or its solution is then reacted with the compound according to (E) and/or (F), the temperature being expediently in the range of 50° to 100° C., preferably between 60° and 90° C., until the NCO content in the prepolymer has dropped virtually to zero. For this purpose the compound (E) is used in a less than stoichiometric amount or in a slight stoichiometric excess, the amounts in most cases being 40 to 110%, preferably 60 to 105% of the required stoichiometric amount. If less reactive diisocyanates are used for the preparation of the prepolymer, this reaction may also take place in water at the same time as the neutralization. Some of the (nonneutralized) COOH groups, preferably 5 to 30%, may be reacted, if desired, with difunctional compounds reactive toward COOH groups such as diepoxides.

Tertiary amines, for example trialkylamines having 1 to 12, preferably 1 to 6 carbon atoms in each alkyl radical, are particularly suitable for the neutralization of the resultant products preferably containing COOH groups. Examples of these are trimethylamine, triethylamine, methyldiethylamine and tripropylamine. The alkyl radicals may also carry, for example, hydroxyl groups, such as in the case of dialkylmonoalkanolamines, alkyldialkanolamines and trialkanolamines. An appropriate example is dimethylethanolamine which preferably serves as neutralization agent.

If desired, inorganic bases, such as ammonia, sodium hydroxide or potassium hydroxide may be used as neutralization agents.

The neutralization agent is usually added in a molar ratio to the COOH groups of the prepolymer of about 0.3:1 to 1.3:1, preferably of about 0.5:1 to 1:1.

The neutralization which usually takes place between room temperature and 80° C., preferably 40° to 80° C., may be carried out in any desired manner: for example the aqueous neutralization agent may be added to the polyurethane resin or vice versa. It is also possible, however, for the neutralization agent to be first added to the polyurethane resin, and water only subsequently. In general, a solids content of 20 to 70%, preferably 30 to 50%, is obtained.

The content of polyurethane resin in the aqueous filler composition generally is 5 to 40, preferably 15 to 30% by weight, based on the total filler composition.

In addition to the polyurethane resin, the aqueous filler composition may also comprise as binder up to 60, preferably up to 30% by weight, based on the polyurethane resin, of another oligomeric or polymeric material, such as water-soluble or water-dispersible phenol resins, polyester resins, epoxy resins or acrylic resins capable of being crosslinked, such as disclosed, for example, in EP Offenlegungsschrift 89,497.

Suitable crosslinking agents are the curing agents usually used for polyol resins, provided they are water-compatible. Examples of such agents are water-compatible (water-soluble or water-dispersible) amino resins, especially commercial etherified melamine-formaldehyde condensates such as hexathoxmethylmelamine, phenolic resins or blocked polyisocyanates, such as those disclosed, for example, in DE Offenlegungsschrift 3,644,372.

The proportion of crosslinking agent is usually about 10 to 35% by weight, preferably 15 to 25% by weight, based on the total amount of the binder to be crosslinked and crosslinking agent.

The aqueous filler composition according to the invention, whose pH is usually in the range of 6.0 to 10.0, preferably 6.8 to 8.5, may also contain the usual paint additives, such as pigments and fillers as well as paint auxiliary agents, for example antisettling agents, antifoams and/or wetting agents, flow control agents, reactive thinners, plasticizers, catalysts, auxiliary solvents, thickeners and the like. At least some of these additives may be added to the filler composition only immediately prior to processing. The selection and proportion of these substances which may be added to the individual components and/or to the overall mixture, are known to the person skilled in the art.

Examples of suitable pigments are iron oxides, lead oxides, lead silicates, titanium dioxide, barium sulfate, zinc oxide, zinc sulfide, phthalocyanin complexes etc. Examples of suitable fillers are mica, kaolin, chalk, quartz powder, asbestos powder, ground shale, various silicic acids, silicates such as talc, including the so-called microtalc, having a particle size of not more than 10 μm (cf. EP Offenlegungsschrift 249,727). These pigments and/or fillers are usually used in amounts of 10 to 70, preferably of 30 to 50% by weight, based on the total solids content of the filler composition.

Suitable catalysts are the customary acid curing catalysts, such as p-toluenesulfonic acid, dodecylbenzenesulfonic acid etc.

The auxiliary solvents, for example ethers such as dimethyl glycol, diethyl glycol, dimethyl diglycol, diethyl diglycol, tetrahydrofuran, ketones such as methyl ethyl ketone, acetone, cyclohexanone, esters such as butyl acetate, ethyl glycol acetate, methyl glycol acetate, methoxypropyl acetate, alcohols such as ethanol, propanol and butanol are used for reasons of environmental safety, if at all, only in amounts as small as possible which usually do not exceed 10, preferably 1 to 5% by weight, based on water (as the principle thinner). The amount of water in the aqueous filler composition is usually about 15 to 80 % by weight, preferably 30 to 60% by weight, based on the total filler composition.

The preparation of the aqueous filler composition takes place by the customary method of paint preparation, as can be seen, for example, in the directional recipes given below.

The aqueous filler compositions which are infinitely thinnable with water and whose total solids content (125° C./2 hrs) is generally 35 to 75, preferably 40 to 60% by weight, are applied in a known manner, preferably by spraying by the pressure method or by airless or electrostatic spraying methods. To cure the applied filler coats, temperatures of 120 to 200° C., preferably 150 to 170° C., are generally utilized. The curing period is generally about 15 to 30 minutes, preferably 18 to 20 minutes.

The crosslinked filler coatings obtained in this manner are distinguished in particular by improved stone-chip resistance at low temperatures (0° C. to −30° C.) and by good intercoat adhesion. In addition, they possess a good elongation at break and an outstanding impact resistance. The resistance to atmospheric humidity and solvents is likewise excellent.

The examples below elucidate the invention.

Example 1

A mixture of 282.8 g of polyester having a molecular weight of 1,020, prepared from adipic acid, 1,6-hexanediol, neopentyl glycol and 42.9 g of dimethylolpropionic acid, and of 75 g of N-methylpyrrolidone was heated to 100° C. The clear solution obtained in this manner was cooled to about 60° and then 121.8 g of a mixture of 2,4- and 2,6-toluylene diisocyanate was added dropwise at this temperature at such a rate that the temperature did not exceed 65° C. to 70° C. The mixture was subsequently stirred at this temperature until the isocyanate value reached 1.6% (=2 isocyanate groups per molecule). 21.0 g of diethanolamine were then added, the melt remaining well stirrable. After the mixture was neutralized with 22.4 g of dimethylethanolamine the finished polyurethane resin was dispersed by the addition of 625 g of deionized water. A clear, about 40% dispersion was obtained having a viscosity of 1050 mPas.

Example 2

A mixture of 220.5 g of a polyester having a molecular mass of 984, prepared from isophthalic acid, adipic acid, neopentyl glycol and 1,6-hexanediol, was heated to 100° C. with 56.6 g of a fatty acid ester of linseed oil containing OH functions, 42.9 g of dimethylolpropionic acid and 100 g of N-methylpyrrolidone in an atmosphere of nitrogen. The reaction mixture was cooled to 60° C. and an isomeric mixture consisting of 2,4- and 2,6-toluene diisocyanate was added dropwise at such a rate that the temperature did not exceed 70° C. On reaching the calculated isocyanate value of 1.6 % (=2 isocyanate groups per molecule), 21.0 g of diethanolamine were added. The solution which was at a temperature of 80° C., was then poured with vigorous stirring into 700 g of deionized water containing 22.8 g of dimethylethanolamine. A clear dispersion having a solids content of 38 % and a viscosity of 1,000 mPas, was formed.

Example 3

A mixture of 235.6 g of a polyester having a molecular mass of 1,020, prepared from adipic acid, 1,6-hexanediol and neopentyl glycol, and 56.0 g of polytetrahydrofuran (M=1,000), 42.9 g of dimethylolpropionic acid and 75 g of N-methylpyrrolidone was reacted with toluene diisocyanate in a manner described in Example 1. After the reaction of the prepolymer with diethanolamine was completed, the reaction mixture was neutralized with 22.8 g of dimethylethanolamine and dispersed in 620 g of deionized water.

Example 4

A polyurethane dispersion was prepared in a manner described in Example 1, except that 15 % of the polyester was replaced by trimethylolpropane. The resultant dispersion was clear and had a viscosity of 1380 mPas.

Example 5

A mixture of 317.1 g of a polyester having a molecular weight of 1130, prepared from adipic acid, hexanediol, neopentyl glycol and terephthalic acid, 42.9 g of dimethylolpropionic acid and 90 g of N-methylpyrrolidone was heated to 100° C. After cooling to 65° C., 183.7 g of 4,4'-diisocyanatodicyclohexylmethane (Desmodur W) were added dropwise and the reaction mixture was subsequently maintained at 80° C. until the calculated isocyanate value of 1.33% (=2 isocyanate groups per mclecule) was reached. 21.0 g of diethanolamine were added, followed by 22.8 g of dimethylethanolamine, and stirring was continued for a further 20 minutes. The polyurethane resin was subsequently dispersed by the addition of 700 g of deionized water.

Directional recipe for filler formulation 58.0 parts of the binder obtained in Examples 1–5 were dispersed with 4.0 parts of a commercial melamine-formaldehyde condensate, 13.3 parts of titanium dioxide, 13.2 parts of barium sulfate (blanc fix micro), 0.1 part of carbon black, 11.1 parts of deionized water and 0.3 part of the customary paint auxiliary materials in a bead mill (20 minutes, 6,000 rpm).

The filler composition was applied by means of a pressure spraygun to a zinc phosphated steel panel coated (about 30 μm) with a cathodically deposited electrocoating primer. The curing of the filler was performed in a circulating air oven for 10 minutes at 80° C., then for 20 minutes at 160° C. (dry film thickness 35±2 μm). A commercial alkyd-melamine automotive finish was applied to the filler coat and baked for 30 minutes at 130° C. (dry film thickness about 30±5 μm).

The test results are summarized in Table 1 below. The resistance characteristics of the films (solvent resistance, water resistance) correspond to the requirements in practice.

Condition of the topcoat

The gloss and surface of the topcoat were subjectively evaluated on the various filler materials according to a rating scale (1 = very good, 5 = very poor).

Stone-chip resistance

This was tested using a stone-chip test instrument according to VDA (from Erichsen, model 508). In preceding tests 1 kg of steel shot (angular, 4–5 mm), was impacted on the test panel with the aid of compressed air (2 bar). The following evaluations were made on the sample panels: topcoat adhesion (0 = no cracking of filler, 10 = complete detachment) and penetration to the metal (0 = no penetration, 10 = a large number of penetrations).

TABLE 1

| Example | 1 | 2 | 3 | 4 | 5 |
|---|---|---|---|---|---|
| Condition of topcoat | 2 | 2 | 2 | 2 | 1–2 |
| Topcoat adhesion | | | | | |
| +20° C. | 1–2 | 2–3 | 2 | 2–3 | 1 |
| −20° C. | 1–2 | 2–3 | 2 | 2–3 | 1 |
| Penetration | | | | | |
| +20° C. | 0 | 1 | 0–1 | 2 | 0 |
| −20° C. | 1 | 2 | 1 | 2 | 0 |
| Crosshatch test (according to DIN 53151) | Gt 0 | Gt 0 | Gt 0 | Gt 0 | Gt 0 |
| Erichsen indentation (according to DIN 53156) | 5.9 | 6.8 | 6.6 | 6.4 | 6.2 |

Example 6

A mixture of 233 g of a polyester having a molecular mass of 832, prepared from 1,6-hexanediol, neopentyl glycol and adipic acid, 42.9 g of dimethylolpropionic acid and 75 g of N-methylpyrrolidone was heated to 110° C. It was cooled to 65° C. and then 121.8 g of an isomeric mixture of 2,4- and 2,6-toluene diisocyanate were added dropwise at such a rate that the temperature did not exceed 70° C.

When the calculated isocyanate value of 1.8 % was reached, 21 g of diethanolamine were added. The resin was heated to 140° C. and 33.6 g of an epoxy resin (EV = 460) were added in portions. The solution was cooled to 90° C. and 24.1 g of dimethylethanolamine were then added. The mixture was subsequently dispersed in 800 g of hot deionized water.

Example 7

A mixture of 233 g of a polyester having a molecular mass of 832, prepared from 1,6-hexanediol, neopentyl glycol and adipic acid, 42.9 g of dimethylolpropionic acid and 75 g of N-methylpyrrolidone was heated to 110° C. The mixture was cooled to 65° C and 121.8 g of an isomeric mixture of 2,4- and 2,6-toluylene diisocyanate were then added dropwise at such a rate that the temperature did not exceed 70° C.

When the calculated isocyanate value of 1.8% was reached, a mixture of 16.8 g of diethanolamine and 1.2 g of hexamethylenediamine was added. Subsequently, 19.3 g of dimethylethanolamine were added and the mixture was dispersed in 630 g of hot deionized water.

Example 8

A mixture of 259 g of a polyester having a molecular mass of 925, prepared from 1,6-hexanediol, neopentyl glycol, adipic acid and isophthalic acid, 42.9 g of dimethylpropionic acid and 75 g of N-methylpyrrolidone was heated to 110° C. The mixture was cooled to 65° C and 121.8 g of an isomeric mixture of 2,4- and 2,6-toluylenediisocyanate was then added dropwise at such a rate that the temperature did not exceed 70° C. When the calculated isocyanate value of 1.7% was reached, 11.6g of hexamethylenediamine were added. Subsequently 20 g of dimethylethanolamine were added and the mixture was dispersed in 670 g of hot deionized water.

We claim:

1. A process for the preparation of filler coatings on substrates, wherein an aqueous filler composition is prepared by admixing water-dispersible polymer as binder and, optionally, other polymeric binders, cross-linking agents and customary additives, the water-dispersible polymer being a polyurethane resin which contains building blocks derived from
   (A) polyisocyanates,
   (B) polyols having an average molecular weight $M_n$ of at least 400,
   (C) low-molecular polyols if desired and,
   (D) compounds containing at least two groups reactive toward isocyanate groups and at least one group capable of forming anions,
   (E) compounds which are monofuctional or contain active hydrogen of variable reactivity, these building blocks being always positioned at the chain end of the polyurethane resin and optionally
   (F) compounds which are other than (B), (C) and (E) and contain at least two groups reactive toward NCO groups.

2. The process as claimed in claim 1, wherein the proportion of polyurethane resin in the aqueous filler composition is 5 to 40% by weight, based on the total filler composition.

3. The process as claimed in claim 1, wherein the aqueous filler composition still contains at least one other binder in an amount of up to 60% by weight, based on the polyurethane resin.

4. The process as claimed in claim 1, wherein the aqueous filler composition contains 10 to 35% by weight, based on the total of the binder to be cross-linked and cross-linking agent, of water-compatible amino resins as crosslinking agents.

5. The process as claimed in claim 1, wherein the polyurethane resin has an average molecular weight e,ovs/M/ $_n$ of 2,000 to 6,000.

6. The process as claimed in claim 1, wherein the hydroxyl value of the polyurethane resin is about 30 to 80.

7. The process as claimed in claim 1, wherein the amount of the building blocks (A) is 10 to 50% by weight, that of the building blocks (B) is 15 to 80% by weight, that of the building blocks (C) is 0 to 20% by weight, that of the building blocks (D) is 2 to 20% by weight and that of the building blocks (E) is 2 to 20% by weight, in each case based on the polyurethane resin.

8. The process as claimed in claim 1, wherein the building block (B) is derived from polyether polyols or polyester polyols having average molecular weights e,ovs/M/ $_n$ of 400 to 5,000.

9. The process claimed in claim 1, wherein the compounds according to (D) are polyols containing at least one carboxyl group.

10. The process as claimed in claim 9, wherein (D) is a α,α-dimethylolalkanoic acid.

11. The process as claimed in claim 1, wherein the compounds according to (E) are monoamines containing at least one OH group.

12. The process as claimed in claim 1, wherein the compounds (F) are water, hydrazine or diamines containing preferably OH groups.

13. A substrate coated by the filler composition according to claim 1.

14. The coated substrate as claimed in claim 13, wherein the substrate is a motor vehicle body.

* * * * *